United States Patent Office 3,806,547
Patented Apr. 23, 1974

3,806,547
PROCESS FOR PREPARING ALICYCLIC
α-NITROKETONES
Philip M. Pivawer, Hamden, Conn., assignor to
Olin Corporation
No Drawing. Continuation-in-part of abandoned application Ser. No. 788,330, Dec. 31, 1968. This application July 1, 1970, Ser. No. 51,727
Int. Cl. C07c 49/00
U.S. Cl. 260—586 A   10 Claims

ABSTRACT OF THE DISCLOSURE

Alicyclic α-nitroketones are provided in excellent yield by reaction of alicyclic olefins with dinitrogen tetroxide and oxygen in the presence of selected dipolar aprotic solvents. The nitroketones are useful in the preparation of commercially important dibasic and amino acids.

---

This application is a continuation-in-part of my copending application Ser. No. 788,330, filed Dec. 31, 1968 and now abandoned.

This invention relates to a process for providing alicyclic α-nitroketones.

Numerous alicyclic α-nitroketones have previously been prepared and described in the literature. The utility of these substituted alicyclic ketones is well known to those skilled in this art. For instance, they are useful as intermediates in the preparation of α,ω-dibasic acids and ω-amino carboxylic acids which are valuable polymer precursors.

Thus, commercially important dibasic acids are readily provided by the reaction of alicyclic α-nitroketones with mineral acids. Typical of this type of reaction is the preparation of adipic acid by the reaction of α-nitrocyclohexanone with mineral acids as described, for instance, by Simmons and Kreuz in J. Org. Chem., 33, 836 (1968).

Valuable amino acids are also provided by the use of alicyclic α-nitroketones as starting reactants. It is known that alicyclic α-nitroketones are cleaved in aqueous base to provide ω-nitro carboxylic acids which are converted to the corresponding amino acids by reduction with hydrogen. Illustrative of this technique is the preparation of 6-aminocaproic acid from 2-nitrocyclohexanone.

Several previous methods of providing alicyclic α-nitroketones from an alicyclic ketone starting reactant have been described as, for instance, by Feuer and Pivawer in J. Org. Chem., 31, 3152 (1966), and in Netherlands Pat. 6712714. However, many of the required alicyclic ketone reactants utilized in these processes are fairly expensive chemicals, and some alicyclic ketones are not commercially available.

Cyclohexene has been utilized as a starting reactant in the preparation of 2-nitrocyclohexanone as reported by Stevens in Chem. and Ind. 499 (1960), wherein cyclohexene is reacted with dinitrogen tetroxide and molecular oxygen in a nonpolar solvent. However, only a very low yield of 2-nitrocyclohexanone is thus provided, and this method is not suited for commercial operation.

Another technique for providing alicyclic α-nitroketones has been disclosed by Lachowicz et al. in U.S. Pat. 3,466,326 wherein a nitrocycloalkylperoxy nitrate is treated with a denitrating agent such as dimethylformamide, dimethylsulfoxide, and the like. The peroxy nitrate starting reactant used therein is provided by the reaction of a cycloalkene with a mixture of dinitrogen tetroxide and oxygen in a nonpolar organic solvent such as hexane, heptane, carbon tetrachloride, diethyl ether and the like. It is known, of course, that peroxy nitrates are unstable compounds and are prone to violent decomopsition. Normal precautions for handling such chemicals usually involve the use of low temperatures (preferably around 0° C. and lower). Thus, while handling of peroxy nitrates on a laboratory scale with suitable precautions might be feasible, it is highly unlikely that peroxy nitrates could be suitably employed on a large scale commercial basis. Furthermore, this procedure for providing the desired nitroketone from the corresponding alicyclic olefin involves a two-step process requiring an intermediate separation.

It has now been found in accordance with this invention that the reaction of alicyclic olefins with dinitrogen tetroxide and oxygen can be carried out in the presence of selected dipolar aprotic solvents wherein alicyclic α-nitroketones are provided directly in very high yield by an integrated technique. This process involves no intermediate isolation thus providing significant economic and safety advantages over known processes.

The operability of any very high yield of alicyclic α-nitroketones obtained in this integrated process step is a most surprising and unexpected feature of this invention. For instance, the nitrooxidation of olefins has heretofore been uniformly carried out in nonpolar solvent media as contrasted to the selected dipolar aprotic solvents employed herein. The nitric acid formed in the course of the nitroketone preparation herein surprisingly does not apparently inhibit or otherwise adversely effect the nitrooxidation process.

The process of this invention is illustrated by the following equation wherein for instance cyclododecene is converted to 2-nitrocyclododecanone.

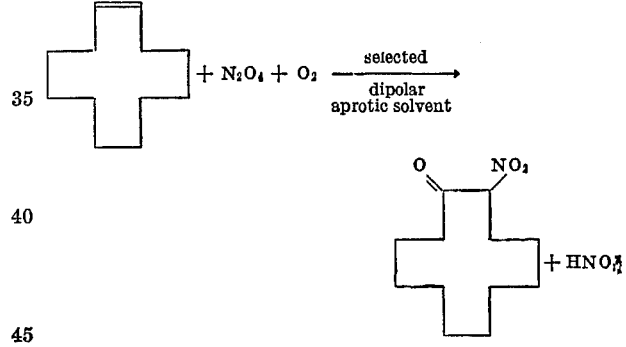

Only selected dipolar aprotic solvents may be advantageously utilized in the practice of this invention described herein. Thus, for instance, dipolar aprotic solvents such as ketones, (i.e., acetone), nitriles such as acetonitrile, sulfones such as dimethyl sulfone and nitroalkanes are not suitably employed in accordance with this invention to provide the advantages in yield and economy hereinbefore described.

It has been found that only those dipolar aprotic solvents containing no olefinic or acetylenic unsaturation and having a negative charge localized on a bare oxygen atom may be suitably utilized in alicyclic α-nitroketone preparation as described herein. Solvents of this nature are known to those skilled in this art having been described in, for instance, Quarterly Review, vol. XVI, 1962, p. 166 and by Zaugg in J. Amer. Chem. Soc., 1960, 82, 2903.

N,N'-dialkyl carboxamides of the formula

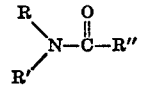

wherein R and R' are each alkyl (preferably lower alkyl having 1–4 carbon atoms) and R" is hydrogen or alkyl (preferably lower alkyl) are particularly suitable as the required dipolar aprotic solvents in the practice of this invention and represent one class of preferred dipolar aprotic solvents. Dimethylformamide, diethylformamide and dimethylacetamide are illustrative compounds of this group.

Other suitable dipolar aprotic solvents include the dialkyl sulfoxides such as dimethylsulfoxides; N,N'-tetraalkyl ureas such as N,N'-tetramethyl urea; hexaalkyl phosphoramides such as hexamethyl phosphoramide and certain phosphonic and phosphinic esters.

N-alkyl lactams are advantageously utilized. Thus, N-alkyl-ε-caprolactams and N-alkyl pyrrolidones such as N-methyl pyrrolidone are effective dipolar aprotic solvents in the practice of this invention.

Amine N-oxides such as pyridine N-oxide and trialkyl phosphine oxides such as trimethyl-, triethyl-, and tributyl phosphine oxides are useful dipolar aprotic solvents; also trialkyl phosphates such as triethyl phosphate. Similarly, heterocyclic amides including N-formyl piperidine, N-acetyl piperidine, N-formyl morpholine, N-acetyl morpholine, N-formyl pyrrolidine, and N-acetyl pyrrolidine are useful dipolar aprotic solvents which are efficaciously employed herein.

Although the dipolar aprotic solvents required herein provide the desired nitroketones even when utilized in small amounts, best results are obtained when a molar excess of these solvents is utilized, that is, more than one mole of solvent per mole of alicyclic olefin reactant. Best results are obtained when an alicyclic olefin concentration of less than about 30% is employed.

Other solvents in addition to the aforementioned selected dipolar aprotic solvents may be employed as diluents in the process if desired. For instance, aliphatic hydrocarbons such as hexane, heptane, etc.; cycloaliphatic hydrocarbons such as cyclohexane, etc.; aromatic hydrocarbons such as benzene, toluene, the xylenes, and the like, and various ethers may be employed as diluents in the practice of this invention, but the use of such diluents does not provide any significant advantages. Further the use of such solvents complicates recovery procedures. Thus, the preferred practice does not encompass use of these solvents in the reaction system.

Alicyclic olefins in general may be utilized in the process described herein. However, preferred reactants are those alicyclic olefins having 6–16 ring carbon atoms. These reactants, in addition, may contain ring substituents which are inert to the reaction system including but not limited to alkyl and/or alkoxy substituents.

It is to be understood that the term "alicyclic olefin" as used in the specification and claims herein includes mono-, di-, tri-, and even tetraolefins. Thus, among the monoolefins which may be employed in the practice of this invention are cyclohexene, cycloheptene, cyclooctene, cyclononene, cyclodecene, cycloundecene, cyclododecene, cyclotridecene, and cyclooctadecene. Other olefins which may be advantageously employed include 1,3-cyclooctadiene, 1,5-cyclooctadiene, 1,4-cyclodecediene, 1,5-cyclodecediene, 1,5-cyclododecadiene, 1,3,5-cycloheptatriene, 1,5,9-cyclododecatriene, 1,3,5,7-cyclooctatriene and 1,5,9,13-cyclohexadecatetraene.

When alicyclic olefins having more than one C=C bond are employed as reactants, alicyclic α-nitroketones with residual olefinic linkages are provided as the main products. These compounds may be cleaved in aqueous basic solution, followed by subsequent reduction of the unsaturation and the nitro group to provide useful ω-aminocarboxylic acids. Illustrative of the use of such alicyclic olefins is Example V hereinafter wherein 1,5,9-cyclododecatriene is employed as a reactant.

It is known to those skilled in this art that dinitrogen tetroxide is actually an equilibrium mixture of dinitrogen tetroxide and nitrogen dioxide with the equilibrium being driven essentially to pure dinitrogen tetroxide at 0° C. and essentially 100% nitrogen dioxide at 140° C. Thus, as used herein in the specification and claims, both the equilibrium mixture and the pure compound are encompassed by the term "dinitrogen tetroxide."

The introduction of the dinitrogen tetroxide and oxygen to the olefinic reaction system is conveniently carried out by a number of procedures. The oxygen may be in highly purified form, if desired, but it is to be understood that it is within the scope of this invention to employ a variety of gaseous streams containing oxygen in the practice of this invention. Thus, oxygen diluted to any desired extent with inert gases such as nitrogen, methane, carbon dioxide and so forth may be employed as the source of molecular oxygen. Air, in fact, may be advantageously and preferably employed as the source of molecular oxygen.

The dinitrogen tetroxide and oxygen may be added to the olefin reaction system either separately or together. One procedure which may be utilized is to pass an oxygen-containing gas over liquid dinitrogen tetroxide and then pass the resulting gaseous mixture into the olefinic reaction system. Alternatively, both the dinitrogen tetroxide and the oxygen-containing gas may be passed into the reaction system in separate gas streams. Another method involves adding the dinitrogen tetroxide to the reaction system in liquid form. Another technique which may be employed is to pressure the entire reaction system with oxygen prior to adding dinitrogen tetroxide to the system.

The desired nitrooxidation of the alicyclic olefins does proceed when equimolar amounts of molecular oxygen and dinitrogen tetroxide are employed, but best results are obtained when at least a 15/1 molar ratio of oxygen to dinitrogen tetroxide is utilized.

The process of this invention is advantageously carried out at a temperature range of about −15° C. to 50° C. Above 25° C., however, it has been found that the yield of nitroketone product is usually adversely effected, and more preferably a reaction temperature range of −15° C. to 25° C. is employed.

Workup of the desired α-nitroketones is readily accomplished. For instance, the desired nitroketone may easily be isolated by pouring the entire reaction mixture into water to obtain the nitroketone either as a solid which may be filtered and recovered by conventional techniques or in some instances to form an oil which may be taken up by appropriate organic solvents and then isolated by either distillation or crystallization procedures.

The following examples are presented to further illustrate the invention without any intention of being limited thereby. All parts and percentages are by weight unless otherwise specified.

EXAMPLE I

To 150 cc. of dimethylformamide was added 27.4 g. (0.15 mole) of cyclododecene (91% pure), and the heterogeneous solution was cooled to 0° C. Dinitrogen tetroxide (10.4 cc., 0.165 mole) was condensed and oxygen was passed over the condensed liquid. The mixture of oxygen and dinitrogen tetroxide was added to the dimethylformamide solution ($O_2/N_2O_4$ ratio was 30/1) over a five-hour period. The temperature was maintained between 0° and 5° C.

At the end of this period, the reaction mixture was poured into ice water. A solid precipitate formed which was collected by filtration and washed thoroughly with water to remove residual acid and then dried. The yield of precipitated product was 35.0 g., M.P. 65°–68° C. VPC analysis indicated a purity of 89.9%, hence the total yield of nitroketone was 31.5 g. (92%). The precipitate was washed thoroughly with hexane in order to remove impurities; yield of purified product 29.4 g. (86.5%), M.P. 74°–75° C. (lit. M.P. 78°–79° C.) The IR spectrum was superimposable on that of an authentic sample of 2-nitrocyclododecanone.

EXAMPLE II 4.4 g. of cyclododecene (91% pure by VPC analysis) was placed in 50 cc. of dimethylformamide. Oxygen (300 cc./min.) was passed over 3.2 cc. of liquid dinitrogen tetroxide, and the resulting mixture was bubbled into the cyclododecene solution over a four-hour period. The exotherm caused the reaction temperature to rise to 40° C., and a cold water bath was used to hold the temperature between 30°–40° C. during the remainder of the reaction period. Then the reaction solution was added to ice water wherein an oily product formed along with an amount of a solid precipitate. Separation of the solid material from the oil was accomplished by washing the solid with a small amount of cold hexane. The solid material isolated was 2.1 g. (18% yield), M.P. 75°–76° C. An infrared spectrum was superimposable on that of an authentic sample of 2-nitrocyclododecanone. The lower yield in this example as compared to Example I shows the adverse effect of higher reaction temperature on yield.

EXAMPLE III

Cyclooctene (16.5 g., 0.15 mole) was placed in 150 cc. of dimethylformamide and the solution was cooled to 0° C. Dinitrogen tetroxide and oxygen were added in a molar ratio of 1/40 over a two-hour period. Rotometers were used to regulate the flow of gases. At the end of the reaction period, the mixture was poured into water, and the oily top layer was extracted with two 50 cc. portions of ether. The combined ether extracts were washed with two 50 cc. portions of water, dried over magnesium sulfate, filtered and the ether evaporated. Distillation of the residual oil at 0.1 mm. afforded 13.1 g. (58% of 2-nitrocyclooctanone, B.P. 75°–92° C. The infrared spectrum was superimposable on that of an authentic sample of 2-nitrocyclooctanone.

EXAMPLE IV 8.8 g. of cyclododecene (91% pure by VPC analysis) was placed in 150 cc. of dimethylacetamide. Oxygen was passed over 6.4 cc. of liquid dinitrogen tetroxide, and the resulting mixture was bubbled into the cyclododecene solution over a five-hour period at 5° to 8° C. At the end of this period, the reaction mixture was poured into ice water to provide a solid precipitate which was washed with cold hexane and then dried. An infrared spectrum on this solid material was superimposable on that of an authentic sample of 2-nitrocyclododecanone, and the desired product was obtained in good yield.

EXAMPLE V

To 150 cc. of dimethylformamide was added 16.4 g. (0.1 mole) of 1,5,9-cyclododecatriene and the solution was cooled to 0° C. Oxygen was passed over liquid dinitrogen tetroxide (6.5 cc., 0.11 mole) and the resulting mixture was bubbled into the triene solution over a four-hour period. The ratio of $N_2O_4$ to $O_2$ was 1/30. After all the dinitrogen tetroxide had been added, the solution was poured into cold water. Two ether extractions removed most of the organic material. The combined ether extracts were washed with two 100 cc. portions of water and then dried over magnesium sulfate, filtered and the ether evaporated. Distillation of the residual oil yielded 3.4 g. of cyclododecatriene, B.P. 67° C. at 0.7 mm. and 7.7 g. (33%) of produce, B.P. 120°–145° C. at 0.15 mm. Redistillation of this cut yielded 5.1 g. of 2-nitro-5,9-cyclododecadiene-one, B.P. 108°–112° C. at 0.1 mm. An infrared spectrum showed strong absorption at 5.8µ(C=O), 64µ($NO_2$) and 10.2µ(C=C).

Analysis.—Calcd. for $C_{12}H_{17}NO_3$: C, 64.57; H, 7.62; N, 6.28. Found: C, 64.64, 64,36; H, 7.81, 7.83; N, 6.09, 6.14.

EXAMPLE VI 11.7 g. of cyclooctene (95% pure) was placed in 150 cc. of dimethylacetamide, and the stirred solution was cooled to 0° C. Dinitrogen tetroxide and oxygen were added in a molar ratio of 1/60 over a two-hour period. After the required amount of dinitrogen tetroxide was added, the mixture was poured into 200 cc. of cold water and the oily top layer was extracted with five 50 cc. portions of ether. The combined ether extracts were dried over magnesium sulfate, filtered and the ether evaporated to give 17 g. of crude product. VPC analysis showed a purity of 90% providing a yield of 2-nitrocyclooctanone of 88%.

EXAMPLE VII

Cyclododecene (16.5 g.) was placed in 150 cc. of dimethylformamide, and the solution was cooled to 0° C. The reactor was placed under a pressure of 100 p.s.i.g. with air, and a mixture of air and $N_2O_4$ in a ratio of 15/1 was added. The pressure was maintained at 100 p.s.i.g. by means of an automatic bleed. After the proper amount of dinitrogen tetroxide was added, the air was vented and the solution poured into ice water. The solid that formed was collected, washed with hexane and dried to give 20 g. (80%) of pure 2-nitrocyclododecanone, M.P. 77° C.

What is claimed is:

1. A process for preparing an alicyclic α-nitroketones which comprises reacting, at a temperature of −15 to 50° C., an alicyclic olefin having 6–16 ring carbon atoms with dinitrogen tetroxide and oxygen in the presence of a dipolar aprotic solvent having a negative charge localized on a bare oxygen atom and not containing olefinic or acetylenic bonds, said solvent being selected from the group consisting of N,N'-di(lower alkyl)carboxamides, dimethylsulfoxide, N,N'-tetramethyl urea, hexamethyl phosphoramide, N-methyl pyrrolidone, pyridine-N-oxide, trimethyl phosphine oxide, triethyl phosphine oxide, tributyl phosphine oxide and triethyl phosphate.

2. The process of claim 1 wherein said alicyclic olefin is cyclododecene.

3. The process of claim 1 wherein said alicyclic olefin is cyclooctene.

4. The process of claim 1 wherein said alicyclic olefin is cyclododecatriene.

5. The process of claim 1 wherein an oxygen/dinitrogen tetroxide molar ratio of at least 15/1 is utlized.

6. The process of claim 1 wherein a temperature range of −15 to 25° C. is employed.

7. The process of claim 1 wherein said solvent is an N,N'-dialkyl carboxamide of the formula:

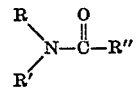

wherein R and R' are each alkyl having 1–4 carbon atoms and R" is hydrogen or lower alkyl having 1–4 carbon atoms.

8. The process of claim 7 wherein said solvent is dimethylformamide.

9. The process of claim 7 wherein said solvent is dimethylacetamide.

10. The process of claim 7 wherein a molar excess of said solvent, based on an alicyclic olefin is employed.

References Cited

UNITED STATES PATENTS 3,466,326  9/1969  Lachowicz et al.  __ 260—586 R

OTHER REFERENCES

Stevens, Chem. and Ind., p. 499 (1960).

LEON ZITVER, Primary Examiner

G. A. SCHWARTZ, Assistant Examiner

U.S. Cl. X.R.

260—586 R